(12) United States Patent
McEntee et al.

(10) Patent No.: US 7,258,834 B2
(45) Date of Patent: Aug. 21, 2007

(54) METHODS AND DEVICES FOR MODIFYING A SUBSTRATE SURFACE

(75) Inventors: John F. McEntee, Boulder Creek, CA (US); Michel G. M. Perbost, Bethany, CT (US); Joseph Vandenburg, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 474 days.

(21) Appl. No.: 10/632,600

(22) Filed: Aug. 1, 2003

(65) Prior Publication Data

US 2005/0023246 A1 Feb. 3, 2005

(51) Int. Cl.
*A61L 2/00* (2006.01)
*C11D 3/02* (2006.01)
*C11D 3/37* (2006.01)
*B44C 1/22* (2006.01)
*C03C 15/00* (2006.01)
*C03C 25/68* (2006.01)
*C23F 1/00* (2006.01)

(52) U.S. Cl. .................... 422/20; 510/179; 510/400; 510/475; 216/89

(58) Field of Classification Search .................. 134/2
See application file for complete search history.

(56) References Cited

U.S. PATENT DOCUMENTS

| | | | | | |
|---|---|---|---|---|---|
| 3,866,398 | A | * | 2/1975 | Vernon et al. | 134/1.3 |
| 3,997,358 | A | * | 12/1976 | Taylor | 134/7 |
| 4,116,851 | A | * | 9/1978 | Rupe et al. | 134/25.2 |
| 4,328,047 | A | * | 5/1982 | Dalton | 148/241 |
| 5,418,136 | A | * | 5/1995 | Miller et al. | 435/5 |
| 5,968,280 | A | * | 10/1999 | Ronay | 134/2 |
| 6,130,015 | A | | 10/2000 | Noddin et al. | |
| 6,221,118 | B1 | * | 4/2001 | Yoshida et al. | 51/309 |
| 6,918,397 | B2 | * | 7/2005 | Lin et al. | 134/22.18 |
| 2002/0007209 | A1 | * | 1/2002 | Scheerder et al. | 623/1.15 |

FOREIGN PATENT DOCUMENTS

| | | | | |
|---|---|---|---|---|
| JP | 58048682 A | * 9/1981 | | 134/2 |
| JP | 58-48682 | 3/1983 | | |
| JP | 58-048682 A | * 3/1983 | | 134/2 |

* cited by examiner

*Primary Examiner*—Jill A. Warden
*Assistant Examiner*—Keri A Moss

(57) ABSTRACT

Methods and compositions for modifying a substrate surface are provided. In accordance with the subject methods, a substrate surface is contacted with a particulate-containing fluid. The fluid is then ultrasonically or sonically agitated to modify the substrate surface. In certain embodiments, the particulate-containing fluid has a pH above the isoelectric point of the substrate. Also provided are devices capable of providing ultrasonic and/or sonic energy and which include a non-acidic, particulate-containing fluid. The subject invention also provides systems and kits for use in practicing the subject methods.

37 Claims, 3 Drawing Sheets

METHODS AND DEVICES FOR MODIFYING A SUBSTRATE SURFACE

FIELD OF THE INVENTION

The field of this invention is substrate surface modification, particularly substrate modification that utilizes ultrasonic or sonic energy such as array substrate modification that utilizes ultrasonic or sonic energy.

BACKGROUND OF THE INVENTION

During many manufacturing and fabrication technologies certain substrate surface modification may be required either during or after manufacture and in any event prior to the use of the final product. Such modifications may include, but are not limited to, polishing, abrading, and roughening a substrate surface, as well as the removal of substances present on a substrate surface. Where a substrate surface is in need of modification, failure to perform the modification may result in adverse results for subsequent manufacturing operations, as well as operations involving the use of the final manufactured product. However, thus far methods and devices for performing these substrate surface modifications have not been wholly satisfactory.

For example, in the instances where the modification includes polishing, roughening or abrading a substrate surface, such may be accomplished manually by an operator. However, these manually performed procedures are time consuming, labor intensive, and often produce inconsistent results. Automated devices have been developed to perform these tasks which decrease labor costs and cycle times. However, the costs to operate and maintain these devices are often high, e.g., to maintain these devices in light of the rigorous wear and tear they are subjected to due to the nature of these tasks.

As noted above, certain modifications may include the removal of substances from a substrate surface. These substances may have been unintentionally deposited thereon, e.g., fingerprints or residues of a previous processing procedure, or may have been intentionally deposited thereon, e.g., needed for a prior processing procedure, but which require removal prior to a subsequent procedure. For example, substances or contaminants such as residual chemistries and films or other particulates and adherent residues may be produced during a processing procedure which may adhere or attach to the substrate.

Accordingly, a variety of techniques have been developed to remove these contaminants from substrate surfaces. In the simplest methods, the substrates are wiped clean with a cloth by a manufacturing operator and in certain instances, given the tolerance of the substrate, a cleaning agent may be employed as well. However, such simple methods are labor intensive, time consuming and oftentimes prove ineffective at removing all the contaminants, especially contaminants not visible to the naked eye of the operator.

In certain instances, substrates may be cleaned with ultrasonically agitated liquids such as water, or water with a surfactant, or an acid such as sulfuric and nitric acid. The ultrasonic energy produces high density sound waves in the liquid causing cavitation on the surface of the substrate immersed in the liquid. In the process, small particles or contaminants adhered to the substrate are broken loose. Such ultrasonic cleaning is widely employed, as it is relatively inexpensive because the required ultrasonic apparatus is simple, incorporates no wearing components such as brushes or pads and requires low maintenance. However, this ultrasonic protocol has limitations. For example, the ultrasonically induced cavitation on the surface of the substrate may not provide sufficient energy to dislodge some contaminants from the substrate surface, thereby ineffectively cleaning the substrate. In the instances where acids such as sulfuric and nitric acids are employed as ultrasonic fluids, the safety of the operator is at risk and the use of such acids requires costly equipment and disposal procedures, e.g., fume hoods, disposal services, specially designed ultrasonic tanks, physical barriers, etc. Furthermore, such acids and the like may actually participate in chemical reactions with the contaminants themselves or other features on the substrate surface, especially if the contaminate on the substrate surface is unknown or is of unknown origin, thereby resulting in further contamination of the substrate.

To address the problem of insufficient energy and thus ineffective substrate cleaning, mechanical scrubbing of the substrate has been employed, in addition to the ultrasonically agitated liquids. However, not all substrates can tolerate such scrubbing. For example, in the semiconductor industry and biopolymeric array industry, small scratches which may result from the scrubbing may render a substrate, i.e., a silicon wafer, array substrate, etc., unusable.

Moreover, the machinery required to practice this scrubbing protocol requires higher maintenance than simple ultrasonic chambers due to the mechanical wear of the motors, pumps, seals, bearing and brushes. For example, mechanical scrubbing of silicon wafers used in the semiconductor industry to fabricate integrated circuits is usually accomplished with porous brushes that are typically made of polyvinylalcohol. These brushes are usually cylindrical in shape and attached to a motor. In use, the brushes are flooded with a liquid such as water with surfactant from the center as they spin, producing a scrubbing action on the substrate surface. Although this protocol is relatively more effective at dislodging contaminates than ultrasonic dislodgement of the contaminants alone, as noted above, it increases costs due to the machinery required, the maintenance of the machinery, and the frequent need to replace the brushes or pads. Furthermore, mechanical scrubbing is less effective at scrubbing uneven surfaces or removing particulates in depressions or holes and also tends to planarize the surface in the direction of the brush action, where such surface planarization is not desirable in some instances, e.g., in those instances where removal of surface contours must be minimized.

As such, there continues to be an interest in the new development of methods and devices for modifying a substrate surface. Of particular interest would be methods and devices that are safe to the operator as well as safe to the environment, easy to use, cost effective, have short cycle times, are compatible with the substrate surfaces being modified such that they do not produce scratches or other unwanted aberrations on the substrates and which are effective at modifying a substrate surface.

References of Interest:

References of interest include: Japanese Patent No.: JP58048682, as well as U.S. Pat. No. 6,130,015.

SUMMARY OF THE INVENTION

Methods and compositions for modifying a substrate surface are provided. In accordance with the subject methods, a substrate surface is contacted with a particulate-containing fluid. The fluid is then ultrasonically or sonically agitated to modify the substrate surface. In certain embodiments, the particulate-containing fluid has a pH above the isoelectric point of the substrate. Also provided are devices capable of providing ultrasonic and/or sonic energy and which include a non-acidic, particulate-containing fluid. The subject invention also provides systems and kits for use in practicing the subject methods.

BRIEF DESCRIPTIONS OF THE DRAWINGS

DEFINITIONS

Figure 1:
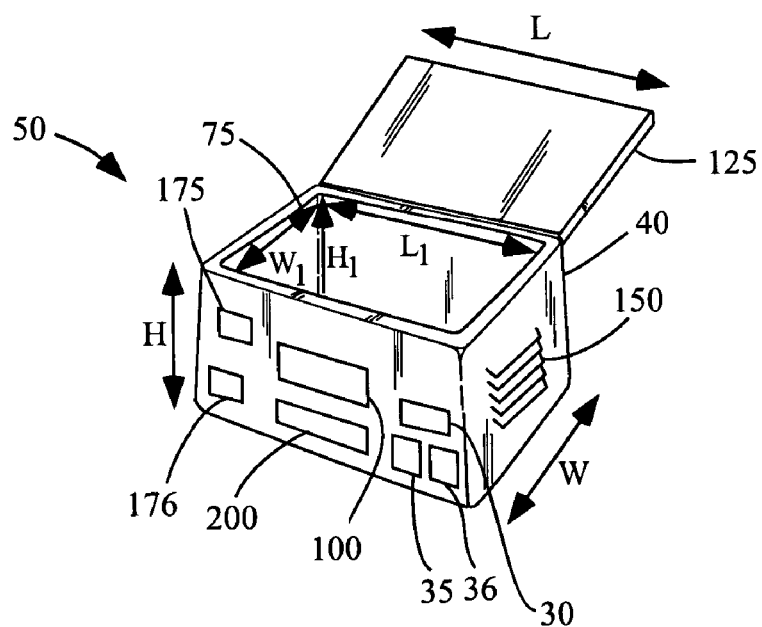
FIG. 1 shows an exemplary embodiment of a subject ultrasonic device.

The term "nucleic acid" as used herein means a polymer composed of nucleotides, e.g., deoxyribonucleotides or ribonucleotides, or compounds produced synthetically (e.g., PNA as described in U.S. Pat. No. 5,948,902 and the references cited therein) which can hybridize with naturally occurring nucleic acids in a sequence specific manner analogous to that of two naturally occurring nucleic acids, e.g., can participate in hybridization reactions, i.e., cooperative interactions through Pi electrons stacking and hydrogen bonds, such as Watson-Crick base pairing interactions, Wobble interactions, etc.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to about 100 nucleotides and up to about 200 nucleotides in length.

The term "polynucleotide" as used herein refers to single or double stranded polymer composed of nucleotide monomers of generally greater than about 100 nucleotides in length.

The term "monomer" as used herein refers to a chemical entity that can be covalently linked to one or more other such entities to form an oligomer. Examples of "monomers" include nucleotides, amino acids, saccharides, peptides, and the like.

The term "oligomer" is used herein to indicate a chemical entity that contains a plurality of monomers. As used herein, the terms "oligomer" and "polymer" are used interchangeably. Examples of oligomers and polymers include polydeoxyribonucleotides (DNA), polyribonucleotides (RNA), other polynucleotides which are C-glycosides of a purine or pyrimidine base, polypeptides (proteins), polysaccharides (starches, or polysugars), and other chemical entities that contain repeating units of like chemical structure.

The terms "nucleoside" and "nucleotide" are intended to include those moieties which contain not only the known purine and pyrimidine bases, but also other heterocyclic bases that have been modified. Such modifications include methylated purines or pyrimidines, acylated purines or pyrimidines, alkylated riboses or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

"Optional" or "optionally" means that the subsequently described circumstance may or may not occur, so that the description includes instances where the circumstance occurs and instances where it does not.

"Array," "microarray" and "biopolymeric array" include any two-dimensional or substantially two-dimensional (as well as a three-dimensional) arrangement of addressable regions bearing a particular chemical moiety or moieties (e.g., biopolymers such as polynucleotide or oligonucleotide sequences (nucleic acids), polypeptides (e.g., proteins), carbohydrates, lipids, etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

Any given substrate may carry one, two, four or more or more arrays disposed on a front surface of a substrate. Depending upon the use, any or all of the arrays may be the same or different from one another and each may contain multiple spots or features. A typical array may contain more than ten, more than one hundred, more than one thousand, more than ten thousand features, or even more than one hundred thousand features, in an area of less than 20 cm$^2$ or even less than 10 cm$^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents but may not be present when, for example, photolithographic array fabrication processes are used. It will be appreciated though, that the interfeature areas, when present, could be of various sizes and configurations.

Each array may cover an area of less than 100 cm$^2$, or even less than 50 cm$^2$, 10 cm$^2$ or 1 cm$^2$. In many embodiments, the substrate carrying the one or more arrays will be shaped generally as a rectangular solid (although other shapes are possible), where the length may range from more than about 4 mm and less than about 1 m, usually more than about 4 mm and less than about 600 mm, more usually less than about 400 mm; a width may range from more than about 4 mm and less than about 1 m, usually less than about 500 mm and more usually less than about 400 mm; and a thickness may range from more than about 0.01 mm and less than about 5.0 mm, usually more than about 0.1 mm and less than about 2 mm and more usually more than about 0.6 and less than about 1.5 mm. With arrays that are read by detecting fluorescence, the substrate may be of a material that emits low fluorescence upon illumination with the excitation light. Additionally in this situation, the substrate may be relatively transparent to-reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 mm.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one which is to be evaluated by the other (thus, either one could be an unknown mixture of polynucleotides to be evaluated by binding with the other). A "scan region" refers to a contiguous (preferably, rectangular) area in which the array spots or features of interest, as defined above, are found. The scan region is that portion of the total area illuminated from which the resulting fluorescence is detected and recorded. An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

"Remote location," means a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart.

"Communicating" information references transmitting the data representing that information as electrical signals over a suitable communication channel (e.g., a private or public network).

"Forwarding" an item refers to any means of getting that item from one location to the next, whether by physically transporting that item or otherwise (where that is possible) and includes, at least in the case of data, physically transporting a medium carrying the data or communicating the data.

DETAILED DESCRIPTION OF THE INVENTION

Methods and compositions for modifying a substrate surface are provided. In accordance with the subject methods, a substrate surface is contacted with a particulate-containing fluid. The fluid is then ultrasonically or sonically agitated to modify the substrate surface. In certain embodiments, the particulate-containing fluid has a pH above the isoelectric point of the substrate. Also provided are devices capable of providing ultrasonic and/or sonic energy and which include a non-acidic, particulate-containing fluid. The subject invention also provides systems and kits for use in practicing the subject methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

The figures shown herein are not necessarily drawn to scale, with some components and features being exaggerated for clarity.

As summarized above, the subject invention provides methods and compositions for modifying a substrate surface. In further describing the subject invention, the subject methods will be described in greater detail, followed by a review of the devices, systems and kits provided by the invention for practicing the subject methods.

Methods for Modifying a Substrate Surface

In accordance with the subject invention, methods for modifying a substrate surface are provided. The subject methods employ ultrasonic or sonic energy to modify a substrate surface (described herein primarily with reference to ultrasonic energy where such is for exemplary purposes only and is in no way intended to limit the scope of the invention). A feature of the subject methods is that a substrate surface is exposed to ultrasonic or sonic energy while contacted with a particulate-containing fluid, where in certain embodiments the particulate containing fluid has a pH above the isoelectric point of the substrate being modified. In certain embodiments, the subject methods are characterized by the use of a neutral or basic, i.e., non-acidic, particulate-containing fluid as the fluidic medium. In this regard, the subject methods employ a fluidic medium that is not only effective at modifying a substrate surface, but that is compatible with a wide variety of substrates and safe for human contact and environmental disposal. Accordingly, the subject invention avoids the problems generally associated with, for example, acidic or organic ultrasonic fluids. As such, the subject methods differ significantly from prior art protocols that use harmful, e.g., acidic, ultrasonic mediums that are hazardous from a health and safety standpoint, may react with surface-bound substances to produce contaminants and/or which do not include particulate in the fluidic medium.

As summarized above, the subject methods are employed to modify a substrate surface. By "modify" it is generally meant any desired action or result that may alter or enhance a substrate surface, for example cleaning, abrading, roughening, polishing a substrate surface. Accordingly, in practicing the subject methods, a substrate surface of interest is contacted with an aqueous, particulate-containing fluid. In contacting the substrate surface, the entire substrate may be immersed in the fluid, or only a portion of the substrate may be contacted with the fluid. In any event, at least the area(s) of the substrate surface that is to be modified is completely contacted with, e.g., submersed, in the particulate-containing fluid. Such contact is accomplished by positioning at least a portion of the substrate into a holding vessel that includes a sufficient volume of the particulate-containing fluid, e.g., a tank or chamber, beaker, etc., where the holding vessel is capable of being operatively associated with or is part of, e.g., integral with, an ultrasonic or sonic agitation apparatus capable of ultrasonically or sonically agitating the contained fluid, as will be described in greater detail below. In many instances, the substrate may be positioned in a suitable substrate retaining element such as a rack, basket or other apparatus to maintain the substrate in a fixed position prior to being positioned into the fluid-containing holding vessel.

The subject methods may be employed in both small and large scale protocols. For example, a single substrate may be subject to the subject methods, e.g., the substrates may be modified in accordance with the subject invention one at a time or sequentially, or a plurality of substrates may be subject to the subject methods simultaneously or at the same time in order to increase throughput. In such instances where a plurality of substrates is modified simultaneously, the substrates may be positioned or loaded in a suitable substrate retaining element such as a rack or basket or the like that is capable of accommodating a plurality of substrates at the same time in a manner that enables contact between the substrate surface and the ultrasonically or sonically agitated fluid, where such a rack or basket with the substrates loaded thereon may then be contacted with the particulate-containing fluid. In other embodiments, each substrate may be positioned in a separate substrate retaining element such as a separate rack, basket or beaker or the like. Once positioned, the substrates can then be contacted with the particulate-containing fluid. Accordingly, in using separate substrate retaining elements that are capable of retaining a volume of fluid therein such as separate beakers, each substrate may be positioned in a respective particulate-containing fluid-filled beaker, where each beaker is operatively associated with an apparatus capable of ultrasonically or sonically agitating the fluids in each beaker simultaneously.

As noted above, in many embodiments the sonic or ultrasonic transmitting medium or fluid, i.e., the substrate-modifying fluid (i.e., the fluidic medium of the subject invention), employed to modify a given substrate surface is a neutral or basic, particulate-containing fluid such that the fluidic medium of the subject invention may be a non-acidic fluidic medium. Accordingly, the subject fluids include aqueous and non-aqueous (solvent) fluid mediums of neutral or basic pH, which fluids contain particulate. However, while the subject invention is primarily described with reference to a non-acidic fluidic medium-, it is to be understood that in certain embodiments the fluidic medium may have a different pH, e.g., a pH that ranges from about 1 to about 7 (i.e., acidic).

The fluidic medium may be any suitable fluid and is one that is capable of transmitting sonic or ultrasonic waves at a suitable frequency for modifying a substrate surface. In general, the fluidic mediums of the subject invention do not degrade or dissolve the particulates contained therein and are compatible with the substrates being modified. That is, the fluidic mediums are ones that do not harm or adversely affect the particulates contained in the medium, e.g., do not dissolve the particulates, or the substrates in need of modification.

A variety of fluids or combinations of fluids may be employed in the subject invention (e.g., aqueous fluids, non-aqueous, etc., as will be described in greater detail below), but regardless of the particular fluid employed in many embodiments the fluid(s) has a substantially neutral, including neutral, or basic, including basic, pH. By neutral or substantially neutral or basic or substantially basic pH, i.e., non-acidic pH, it is meant that the pH of the fluids typically range from about 7 to about 14, e.g., from about 7 to about 13, e.g., from about 7 to about 10. The above-described pH range confers significant advantages to the subject invention. For example, harnessing electrostatic effects is but one important role that the non-acidic pH of the subject fluids can play in the subject methods. Specifically, employing an appropriate neutral or basic pH provides an optimized condition for substrate surface/contaminant electrostatic repulsion. Since like charges repel, employing an appropriate pH (a pH that falls within the ranges described above) relative to the isoelectric point of the substrate surface and pKa of a given contaminant present thereon improves the efficiency of the substrate modification protocol. Raising the pH past the isoelectric point produces a substrate surface, e.g., steel or glass, that has a more negatively charged character. Accordingly, if a contaminant present on the substrate surface also has a negatively charged character at the particular non-acidic pH employed, then the negatively charged substrate surface will repel the negatively charged contaminant. In addition to substrate surfaces, many contaminants can also undergo a change in electrical charge due to the non-acidic pH employed, where such a change facilitates the substrate modification protocol. For example, where a contaminant is an acid, the higher pH of the subject invention (i.e., above the isoelectric point of the acid) increases the concentration of the negative conjugate base. Thus, when the substrate surface has a negatively charged characteristic (i.e., the pH is above the isoelectric point of the substrate surface), the contaminant and the substrate surface will repel one another. For example, where the substrate surface is glass and the contaminant is also glass, at non-acidic pH silanol are deprotanated and have a negative charge. In this instance, the substrate surface is negatively charged and the glass contaminant (i.e., laser debris) is also negatively charged such that the negative charges repulse each other and the glass contaminant is "pushed" away from the substrate surface. Another such example is stearic acid contaminant on a steel substrate and a non-acidic pH (e.g., about 8.5 or above (pH above the isoelectric point of steel)), which results in the steel substrate and the stearate ions repelling each other. Still further, the inventors of the present invention have realized that, e.g., when employing glass substrates and an aqueous, silica particulate-containing fluid, pH lower than that described for the subject invention (i.e., an acidic pH) is undesirable because it may cause the particles of the particulate-containing fluid to adhere to each other and/or to the substrate itself. Other advantages of using a particulate-containing fluid having a non-acidic pH are described elsewhere herein and these, as well as other advantages, will be apparent to those of skill in the art. Accordingly, of interest in the subject methods is a fluidic medium that has a pH above the isoelectric point of the substrate being modified and/or above the isoelectric point of a contaminant present on the substrate surface.

Fluids that may be employed in the subject invention include, but are not limited to, aqueous, semi-aqueous and non-aqueous fluids, including organic and inorganic fluids, e.g., suitable solvents and the like (e.g., synthetic solvents, organic solvents, etc.). Representative fluids include, but are not limited to, water (tap or pure water (or substantially pure water), e.g., deionized (d.i.) water, distilled water, etc.,), alcohols, chlorinated water, etc. For example, suitable fluids include, but are not limited to, water, toluene, ethanol, acetone, acetyl nitrile, dichloromethane($CH_2Cl_2$), water with calcium chloride (various concentrations up to saturated), water with lithium chloride (various concentrations up to saturated), etc. Accordingly, in many embodiments of the subject invention the neutral or basic, the particulate-containing fluid is 100% pure water or substantially pure water and particulate or 100% pure water or substantially pure water (and optionally one or more additional components as described below), particulate and a buffering system (and optionally one or more additional components as described below), thus providing an effective substrate modifying fluid that is easy to prepare and is safe for human contact and environmental disposal. Of course, the fluids described above are exemplary only and are in no way intended to limit the scope of the invention as other suitable fluids may be employed. In certain embodiments two or more different fluids may be employed, e.g., simultaneously as a single solution, or sequentially.

The fluidic mediums employed in the subject invention may or may not include additional components, e.g., buffers, emulsifiers, dispersants, surfactants (anionic, nonionic, cationic, amphoteric), wetting agents, saponifiers, builders, alkaline salts, chelating agents, sequestering agents, etc. Many embodiments employ a chemical buffer to prevent the pH from changing significantly from a desired pH, e.g., due to exposure to the air.

Regardless of the particular fluid employed, e.g., whether aqueous or non-aqueous, organic or inorganic, etc., an amount of the fluid is present which contains particulates. A given particulate-containing fluid may include a mixture of different particulates, e.g., different sizes and/or materials and/or shapes, etc. The amount or rather the ratio of fluid to particulates may vary depending on the particular modification protocol performed. The amount of fluid in a given particulate-containing fluids may range from as little as about 1% by volume of fluid (about 99% particulate by volume) up to about 99% fluid by volume (i.e., about 1% particulate by volume), e.g., the amount of fluid may range from about 10% fluid to about 99% fluid by volume (i.e., about 90% to about 1% particulate by volume), e.g., about 50% to about 99% fluid (i.e., about 50% to about 1% particulate by volume), e.g., 85% to about 98% fluid (i.e., about 15% to about 2% particulate by volume), e.g., about 80% to about 95% fluid by volume (i.e., about 20% to about 5% particulates by volume). However, the above-described ranges are exemplary and may change as required for a particular protocol. For example, as described in greater detail below, the fluidic mediums include particulates. Preparation of a fluidic medium according to the subject invention may include combining an amount of fluid, e.g., an aqueous medium such as water, with an amount of particulates which are in the form of a slurry of particulates, which slurry may range from about 1% to about 90% or more by volume of particulates, e.g., 4% to about 50%, where in many embodiments a slurry of about 50% particulates (v/v) is employed. A preparation of a particulate slurry may be used to facilitate handling of the particulates and/or to increase user safety (e.g., in certain embodiments if the particulates are not in a slurry form, they may become airborne and present risk of inhalation). A given slurry may be a mixture of different particulates, e.g., different sizes and/or materials and/or shapes, etc. In certain embodiments, the particulate bearing slurry (i.e., particulate present in a slurry liquid) may be about 50% water by volume (i.e., 50% (v/v) particulates. To provide a fluid medium for substrate surface modification, a suitable amount of this 50% (v/v) slurry may be added to a fluid, such as deionized water, to provide a particulate-containing fluid for substrate surface modification. For example, if 8% particulates are desired in a resulting particulate-containing fluid, 16% of the slurry is mixed with 84% fluid (such as deionized water). In certain embodiments the particulate-containing fluid is prepared by combining about 15% slurry to about 85% fluid such as deionized water to provide a resulting particulate-containing fluid having a water content that is about 93% by volume. However, as described above, the water content/ particulate content will vary depending on the protocol.

In the embodiments where the fluid is an aqueous fluid, the water that is used to produce the subject fluids may be obtained from any convenient water source such that the water may be tap water obtained from, for example, a municipal water district. The water employed in the subject invention may be purified or otherwise treated, e.g. to remove certain undesirable agents that may be initially present therein such as certain organic and inorganic chemicals, heavy metals, etc. Such purification or treatment protocols include, but are not limited to, deionization, distillation, and the like, where such protocols are well known to those of skill in the art. The aqueous mediums may include a suitable buffering system, as noted above, to maintain a suitable pH, e.g., to maintain the pH at a non-acidic, i.e., substantially neutral or basic, pH.

As described above, the fluidic mediums include particulates. The particulates facilitate the modification of the substrate surface by their interaction therewith during ultrasonic or sonic agitation of the particulates. The particulates employed in the subject invention may be any suitable particulates as long as the particulates are compatible with the fluidic medium, i.e., insoluble in the fluidic medium in which it is retained, whether aqueous or solvent bases, such that the particulates are capable of retaining a solid form in the fluidic medium, they are compatible with the substrate being modified, i.e., they do not adversely affect the substrate being modified, and they are compatible with the vessel employed to retain the particulates during sonic agitation.

The amount of particulates present in the particulate-containing fluids will vary depending on a variety of factors such as the size of the particulates, etc. As noted above, the amount of particulate in a given particulate-containing fluid may range from as little as about 1% up to as much as about 99% by volume of particulates. Typically, though not always, the particulate-containing fluids include particulates in the concentration range from about 2% by volume to about 50% or more by volume, e.g., from about 3% by volume to about 20% by volume, e.g., from about 5% by volume to about 15% by volume. However, such ranges are exemplary only and are in no way intended to limit the scope of the invention such that the amount of particulates in the fluidic medium may be less than about 2% or more than about 50% in certain embodiments, e.g., about 60% or more, e.g., about 70% or more, where in certain embodiments the amount of particulates in the particulate-containing fluid may be as high as about 80% or more as described above. For example, in certain embodiments a final particulate-containing fluid (e.g., a non-acidic particulate-containing fluid) may include 14.2 liters (3.75 gallons) of particulate slurry (where the slurry includes about 50% silica particulates in deionized water (with NaOH and buffer)) and 80.4 liters (21.25 gallons) of deionized water for a total fluid volume of 94.6 liters (25 gallons) and a particulate content in the final fluid of about 15% by volume particulate to fluid.

The size of the particulates may vary. In certain embodiments, the particulates are of a size small enough to remain in suspension in the particulate-containing fluids, i.e., will not be able to settle at the bottom of the container holding the particulate-containing fluid when the particulate-containing fluid is not being agitated by ultrasonic or sonic energy, so that the fluid is a suspension of the particulates. The sizes of the particulates range from about 15 nanometers to about 500 microns, usually from about 20 nanometers to about 100 microns and more usually from about 20 nanometers to about 5 microns. A given fluid may include particulates of only one size, e.g., all particulates are about 40 nanometers, or may include particulates of varying sizes, e.g., particulates ranging in size from about 15 nanometers to about 75 microns. For example, a given fluidic medium may include two or more specific particulates sizes, e.g., particulates of sizes in the range of about 30-50 nm and particulates of sizes in the range of about 3-10 micron.

The particulates may assume a variety of shapes ranging from simple to complex. In many embodiments, the particulates will have a spherical, ellipsoidal (oblate ellipsoidal, prolate ellipsoidal, etc.), toroidal, polyhedral (various crystals), cylindrical, triangular, etc., shape, although other shapes are possible as well, such as irregular or complex shapes. A given fluidic medium may include particulates of only one shape, e.g., all particulates are spherical, or may include particulates of varying shapes, e.g., spherical, triangular and ellipsoid, etc.

In certain embodiments, the particulates and the fluidic medium containing the particulates have substantially the same specific gravities. By substantially the same specific gravities it is meant that the specific gravities typically do not differ by more than about 15%, usually not more than about 10% and more usually not more than about 5%, where in certain embodiments the specific gravities do not differ at all and as such are exactly the same. In this manner, regardless of the sizes of the particulates, the particulates will remain suspended in the fluidic medium for prolonged periods of time when the particulate-containing fluid is not being agitated by ultrasonic or sonic energy (e.g., more than about 5 minutes or more, e.g., more than about 1 hour or more, e.g., more than about 24 hours or more, where the particulates may remain suspended in the fluidic medium for periods of time longer than about 24 hours, e.g., about week or more, e.g., about a month or more, e.g., a year or more such as about a year to about tow or more years). The exact specific gravities will vary depending on the particular fluidic medium, temperature of the fluid and particulates employed. In certain embodiments, the specific gravities range from about 1.00 to about 1.50. For example, in certain embodiments the fluidic medium is distilled water (specific gravity of 1.0 at 20° C.). In such embodiments, the specific gravity of the particulates is about 1.0 at 20° C.

In general, the material of the particulates is chosen to effectively perform a particular surface modification protocol and achieve the desired results without adversely affecting the substrate being modified or the vessel in which the particulates and substrate are held. For example, if the desired results are to abrade, roughen or polish a substrate surface, a material is selected such that the hardness of the particles is appropriate to accomplish this task without adversely affecting the substrate (e.g., the particulates may be harder than the substrate, but not so hard as to damage the substrate). If the substrate surface is not to be abraded, e.g., if the desired result is solely to remove contaminants from the substrate surface, then a material is selected such that the hardness of the particles is appropriate for this task without adversely affecting the substrate (e.g., the particulate material may be softer than the substrate). The hardness of the particulates may vary, but in many embodiments the hardness of the particulates may range from about 2.5 to about 10, usually from about 4 to about 8 and more usually from about 5 to about 7, as measured on the Mohs Hardness Scale. A given fluid may include particulates where all are of the same hardness or may include particulates of varying hardnesses.

The particulates may be fabricated from a single material, or be a composite of two or more different materials. For example, the particulates may be fabricated from a "composite," i.e., a composition made up of different or unlike materials. The composite may be a block composite, e.g., an A-B-A block composite, an A-B-C block composite, or the like. Alternatively, the composite may be a heterogeneous combination of materials, i.e., in which the materials are distinct from separate phases, or a homogeneous combination of different or unlike materials. As used herein, the term "composite" is used to include a "laminate" composite. A "laminate" refers to a composite material formed from several different bonded layers of identical or different materials. Representative materials from which particulates may be fabricated include, but are not limited to: polymeric materials including synthetic and naturally occurring polymers such as elastics, plastics, and the like, e.g., rubbers, polyacrylamide, polyacrylate, polymethacrylate, polyesters, polyolefins, polyethylene, polytetrafluoro-ethylene, polypropylene, poly (4-methylbutene), polystyrene, poly (ethylene terephthalate); silica (e.g., $SiO_2$); ceramics; metal oxides; metals such as tungsten, aluminum, copper, stainless steel, gold, etc. (e.g., CMP slurries of such metal particulates); any fossilized microskeletal debris or fossil silica deposits, e.g., fossilized debris or dirt that includes silicate skeleton, e.g., foraminifera, diatomea, and the like such as diatomaceous earth (e.g., Celite®), and the like. As noted above, in certain embodiments the particulates may be fabricated from polymeric materials such as synthetic polymeric materials. Of interest is the use of polymeric materials that are elastic such that these materials are capable of recovering size and shape without the assistance of an applied force or other stimuli (i.e., they recover on their own) after deformation. Elastic materials include, but are not limited to, any natural or synthetic organic polymers of high molecular weight (between about 150,000 grams/mole and about 1,500,000 grams/mole) capable of recovering size and shape without the assistance of an applied force or other stimuli (i.e., they recover on their own) after deformation. These elastic materials have the advantage of longevity, i.e., have useful life spans that are relatively long. Furthermore, they can be made to have no sharp edges when such is necessary, only elastically deform upon contact with a substrate surface and their densities may be easily formulated to match the density of the aqueous medium in which they are included when such is required. In certain embodiments, the particulates may be plastic particulates (which may or may not be elastic) whereby plastic it is meant any synthetic organic polymer of high molecular weight (for example at least about 1,000 grams/mole, or even at least about 10,000 or about 100,000 grams/mole).

As noted above, certain embodiments of the subject fluids include additional components such as surfactants, saponifiers, wetting agents, dispersants, emulsifiers, filler, etc. Representative surfactants and saponifiers that may be used with the subject invention include, but are not limited to, sodium hydroxide and the like.

In order to maximize cavitation of the particulate-containing fluids, the viscosity of the fluids must be optimized for this ultrasonic or sonic agitation. Such optimization typically requires the fluid to have minimal viscosity. Accordingly, the viscosity of the fluids usually range from about 1.0 centipoise to about 100 centipoise at the temperature at which the ultrasonic or sonic agitation is performed, usually about 1.14 centipoise to about 10 centipoise at the temperature at which the ultrasonic or sonic agitation is performed.

As noted above, a feature of certain embodiments of the subject invention is that the particulate-containing fluids have a pH that is neutral or substantially neutral, or basic or substantially basic, i.e., the fluids of the subject invention have a pH that falls within the neutral or basic pH ranges described above such that the pH of these fluids is typically maintained in the range from about 7 to about 14, e.g., from about 7 to about 13, e.g., from about 7 to about 10. Any suitable buffering system may be employed, if necessary, to maintain the pH in these neutral or basic ranges, where such buffers are well known in the art. In certain embodiments, e.g., where the fluidic medium is pure water, a buffering system may not be needed. As reviewed above, in certain embodiments the pH may range from about 1 to about 7, i.e., may be acidic.

In accordance with the subject invention, at least a portion of a substrate surface is contacted with the particulate-containing fluid. The amount of fluid employed will depend on the size and shape of the substrate. Typically a volume ranging from about 5 ml to about 100 ml per square inch of substrate surface may be employed, usually from about 10 ml to about 50 ml per square inch of substrate surface may be employed and more usually from about 20 ml to about 30 ml per square inch of substrate surface may be employed. For example, for a substrate having dimensions of about 1"× about 3"× about 1 mm (e.g., a glass microscope slide), the volume of fluid employed may range from about 60 ml to about 90 ml.

Prior to contacting the substrate with the particulate-containing fluid, the fluid may optionally be degassed to remove small gas bubbles from the fluid. The time and temperature for degassing the particulate-containing fluid will vary depending on the particular fluid and volume thereof, etc. The parameters for degassing are well within the knowledge of those of skill in the art and thus for the sake of brevity will not be reviewed herein.

Once the substrate surface is contacted with the particulate-containing fluid, the fluid is ultrasonically or sonically agitated. This ultrasonic or sonic agitation is accomplished with one or more ultrasonic or sonic generators and one or more elements capable of producing a vibratory effect in the fluid, e.g., speaker coil, transducers, and the like. For example, magnetostrictive and piezoelectric transducers may be employed in the subject invention to provide the required vibratory effect.

Regardless of the protocol employed to produce the ultrasonic or sonic agitation, such ultrasonic or sonic agitation causes numerous cavitation bubbles to form and collapse adjacent the substrate surface. Cavitation intensity, and thus optimum cavitation, is dependant on a variety of parameters such as ultrasonic or sonic frequency, ultrasonic or sonic power, time, temperature, the particular fluid employed, etc. Accordingly, the parameters will vary according to the particular task at hand. In certain embodiments, a low boiling point solvent may be employed to facilitate cavitation.

A feature of the subject invention is that the particles in the fluid, driven by the ultrasonic agitation or acoustic waves, contact or bombard the substrate surface to modify the surface. This particle contact, alone or in concert with the cavitation bubbles, occurs with sufficient force to accomplish the desired substrate surface modification. For example, if the task is to remove one or more contaminants from the substrate surface, the particles are contacted with the substrate surface with sufficient force or energy to cause the contaminant(s) to be removed from, e.g., broken free from, the substrate surface. If the task is to abrade, roughen or polish the substrate surface, the particles are contacted with the substrate surface with sufficient force or energy to abrade, roughen or polish the substrate surface.

In accordance with the subject invention, the ultrasonic or sonic agitation of the particulate-containing fluids is performed at ultrasonic or sonic frequencies, and in many embodiments, though not always, at frequencies greater than about 20 kHz, e.g., greater than about 40 kHz, such that in many embodiments the frequency ranges from about 20 kHz to about 200 kHz. However, frequencies lower than about 20 kHz may also be employed, e.g., frequencies in the range of about 20 Hz to about 20 kHz.

Any suitable ultrasonic or sonic protocol may be employed. For example, in certain embodiments the frequency may be pulsed (i.e., repeatedly turned on and off at a rate which may vary, e.g., from once every several seconds to several hundred times a second). In certain other embodiments, the frequency may be swept (i.e., the frequency of the output of the ultrasonic or sonic generator may be modulated around a central frequency). Still further, a particular wave signal may be employed to achieve a desired effect, e.g., a square wave signal may be applied to the one or more transducers to provide a multi-frequency protocol (i.e., to provide multi-frequency vibrations simultaneously).

The ultrasonic power employed in the subject invention must be adequate to cavitate a sufficient volume, typically all, of the particulate-containing fluid employed and to cause the particles therein to disperse in the fluid and contact the substrate surface. As such, the amount of sonic or ultrasonic power required for a particular task is dependant upon the volume of fluid employed, as well as other factors including, but not limited to, the surface to mass ratio of the substrate being ultrasonically modified, etc. For example, as fluid volume is increased, the power required to produce the desired effect may be different than that required for lesser volumes, e.g., the power required may be less. Objects with relatively high surface to mass ratios may require different (e.g., greater) power than that required for objects with less surface to mass ratios. Typically, for substrates having the dimensions described above and present in about a 25 gallon tank, the sonic or ultrasonic power may range from about 500 watts to about 5000 watts, e.g., from about 1000 to about 3000 watts, e.g., from about 1500 watts to about 2000 watts. However, these ranges are exemplary only and are not intended to limit the scope of the invention.

The time period of the ultrasonic or sonic agitation may vary depending on a variety of factors including the specific ultrasonic fluid employed, the temperature at which the ultrasonic agitation is performed, the type and amount of material to be removed (if removal of a material is desired), etc. In general, the subject invention enables relatively short cycle times as compared to conventional protocols due at least in part to the action of the particulates on the substrate surface. For example, in certain embodiments the time period may be less than about 5 seconds, e.g., may range from about 1 to about 5 seconds in certain embodiments. Accordingly, the time period for a substrate surface modification protocol according to the subject invention may range from about from about 5 seconds to about 24 hours or more (e.g., a few days, weeks, etc.), e.g., from about 5 seconds to about 5 hours, e.g., from about 1 minute to about 120 minutes and in many embodiments may range from about 5 minutes to about 30 minutes. However, these ranges are exemplary only and are not intended to limit the scope of the invention.

As noted above, in certain embodiments the temperature of the particulate-containing fluids during substrate surface modification may be less or greater than room temperature. The particular temperature employed will depend on a variety of factors such as the particular particulate-containing fluid employed, etc. The particulate-containing fluid may be ultrasonically or sonically agitated at a temperature that ranges from about $-20°$ C. to about 100, e.g., from about $0°$ C. to about $100°$ C., e.g., from about $20°$ C. to about $100°$ C., e.g., from about $25°$ C. to about $70°$ C., e.g., from about $30°$ C. to about $60°$ C., however these temperatures are exemplary only are in no way intended to limit the scope of the invention. For example, in certain instances temperatures below about $-20°$ C. may be employed, e.g., using fluids other than aqueous mediums. For example, using a particulate-containing helium solution, temperature employed may be as low as about $-269°$ C. Sub-ambient temperatures may harden certain contaminants making them less resilient to the subject methods and easier to remove. Sub-ambient temperatures may be employed where the contaminant is resilient to removal at room temperature, but which becomes less resilient, e.g., brittle, at lower temperatures.

Once a substrate surface has been modified as described above, typically, the substrate is rinsed or washed. That is, the modified substrate surface is removed from the particulate-containing fluid after an ultrasonic or sonic agitation cycle and contacted with a rinse or wash medium. A variety of rinse or wash mediums may be employed and will vary depending on the particular task at hand. Representative rinse or wash fluids include, but are not limited to, water, aqueous surfactant fluids, pH buffered solutions, and the like. For example, in certain embodiments, following surface modification, a given protocol may include washing or rinsing a modified substrate by contacting it with an aqueous surfactant solution followed by a water rinse. Alternatively or in addition to the above, a given protocol may include contacting a modified substrate with a pH buffered aqueous solution followed by a water rinse, etc. In many embodiments, the rinse or wash medium is agitated, e.g., ultrasonically or sonically agitated, placed on a stir-plate, mixer, shaker, etc., while the substrate surface is contacted thereto. In those embodiments where the rinse or wash fluid is ultrasonically or sonically agitated, such may be accomplished in a manner analogous to that described above, e.g., analogous ultrasonic or sonic parameter and/or the rinse or wash fluid(s) may include particulates therein. In many embodiments, a substrate surface is sequentially contacted with a plurality of rinse or wash fluids, where some or all of the various rinse or wash fluid may be the same or may be different.

Regardless of whether or not a substrate surface is rinsed or washed subsequent to substrate surface modification, in certain embodiments the substrate surface is dried following either the ultrasonic or sonic agitation cycle or one or more rinse or wash cycles, prior to a subsequent processing protocol, e.g., the next manufacturing step, final use of the product, etc. Such drying may be accomplished by air drying, heat drying, vacuum drying, etc.

Some or all of the above-described methods for modifying a substrate surface using ultrasonic or sonic agitation may be automated, e.g., by employing automated material handling systems for some or all of the steps of the subject methods. For example, automated conveyer systems may be employed to transport a substrate into and out of the particulate-containing fluid, rinse or wash medium, drying station, etc.

Devices

As summarized above, the subject invention also includes devices that may be used in practicing the subject methods. In other words, the subject devices are ultrasonic or sonic apparatuses capable of effectively carrying out the ultrasonic or sonic agitation of the particulate-containing fluids such that the devices include a particulate-containing fluid, as described above, e.g., a particulate-containing fluid that has a pH above the isoelectric point of a substrate to be modified thereby. In certain embodiments as noted above, the particulates present in the fluid medium may be polymers such as synthetic polymers (e.g., elastic particulates) and/or may have the same specific gravity as the fluid medium and/or the fluid medium may be non-acidic (e.g., basic).

As the fluids include particulates, a feature of the subject devices is that they are configured to withstand the ultrasonic or sonic agitation of the particles without damage to the devices. In further describing the subject devices, reference to ultrasonic devices is primarily used for exemplary purposed only and is in no way intended to limit the scope of the invention, e.g., analogous sonic energy producing devices are also contemplated by the subject invention.

In general, the subject devices include at least the following components: (1) one or more fluid holding vessels, e.g., tanks, chambers, etc., (2) one or more ultrasonic or sonic generators, and (3) one or more elements capable of producing a vibratory effect in the fluid to provide ultrasonic or sonic agitation of the fluids. Other optional components such as one or more heating elements, pumps, filters, timers, switches, flow control valves, etc., may also be included and will be described in greater detail below. The apparatuses may be of unitary construction, i.e., self-contained having all of the components in a single unit, or some or all of the components may be separate components capable of being operatively associated with the subject apparatuses or with certain other components, i.e., the subject apparatuses may include some modular components. In further describing the subject invention, the various components are described in the singular, but it is to be understood that more than one component may be employed, e.g., more than one generator, transducer, etc.

As described above, the subject apparatuses may be used in small scale operations or large scale operations and as such the sizes of the apparatuses will vary depending on the particular protocol performed. For example, the apparatuses may be small enough to be positioned on a benchtop or may be of a size too large for benchtops.

FIG. 1 shows an exemplary embodiment of a subject device 50 that includes ultrasonic apparatus 40 (sonic apparatuses have analogous components and features). Apparatus 40 includes power generator 200 and vibratory element 100, as well as optional heating element 175, optional filter system 176 and optional lid or cover 125 and optional heat exhaust element 150. Apparatus 50 also includes fluid holding vessel 75 which is dimensioned to accommodate a volume of fluid in the ranges described above. Apparatus 50 also includes optional visual indicator 30 and manual switches 35 and 36, e.g., for turning on and/or off the apparatus. The components of the apparatus are shown as integral to the apparatus, but as noted above some or all of the components may be separate or "stand-alone" components.

As noted above, apparatus 40 may be configured for relatively small scale operations. As shown in FIG. 1, the outer dimensions of the apparatus may be characterized by width (W), height (H) and length (L) and the inner dimensions or rather the dimensions of holding vessel 75 may be characterized by width ($W_1$), Height ($H_1$ (partially obstructed in this view, but which extends to the bottom of holding vessel 75)) and length ($L_1$). As such, the width of the apparatus may range from about 3 inches to about 35 inches, e.g., from about 5 inches to about 30 inches, e.g., from about 12 inches to about 24 inches, the length of the apparatus may range from about 3 inches to about 35 inches, e.g., from about 5 inches to about 30 inches, e.g., from about 12 inches to about 24 inches, and the height of the apparatus may range from about 4 inches to about 25 inches, e.g., from about 6 inches to about 22 inches, e.g., from about 8 inches to about 18 inches. The dimensions of holding vessel 75 may be as follows: the width of the apparatus may range from about 2 inches to about 30 inches, e.g., from about 6 inches to about 24 inches, e.g., from about 10 inches to about 20 inches, the length of the apparatus may range from about 2 inches to about 30 inches, e.g., from about 6 inches to about 24 inches, e.g., from about 10 inches to about 20 inches and the height of the apparatus may range from about 2 inches to about 20 inches, e.g., from about 4 inches to about 18 inches, e.g., from about 6 inches to about 16 such that holding vessel 75 may have a volume that ranges from about 100 ml to about 275 liters, e.g., from about 2 liters to about 150 liters, e.g., from about 8 liters to about 80 liters. Apparatuses with shapes other than square or rectangular, e.g., circular, etc., will have analogous dimensions.

Figure 2:
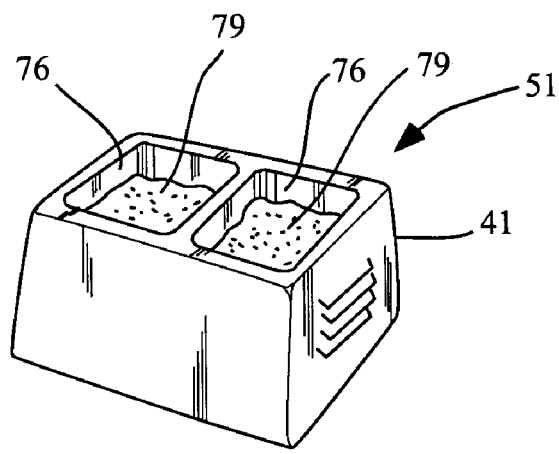
FIG. 2 shows another exemplary embodiment of a subject ultrasonic device having a plurality of fluid holding vessels.

FIG. 2 shows an exemplary embodiment of a subject device 51 that includes ultrasonic apparatus 41. Apparatus 41 is analogous to apparatus 40 of FIG. 1 except that apparatus 41 includes two holding vessels 76. The dimensions of holding vessels 76 may be analogous to the dimensions of holding vessel 75 of FIG. 1 or may be smaller. In this particular embodiment, only two holding vessels are shown, however more than two may be present, e.g., the number of holding vessels present may range from about 1 to about 65, e.g., from about 1 to about 10, e.g., from about 1 to about 4. In the embodiments having more than one holding vessel, the holding vessels may be configured to hold the same or different fluids such that one or more may include an ultrasonic fluid such as a particulate-containing fluid described above and one or more other holding vessels may include one or more rinse or wash mediums. In this particular embodiment, holding vessels 76 are shown having fluids 79 contained therein, such that at least one of the fluids is a particulate-containing fluid according to the subject invention.

Figure 3:
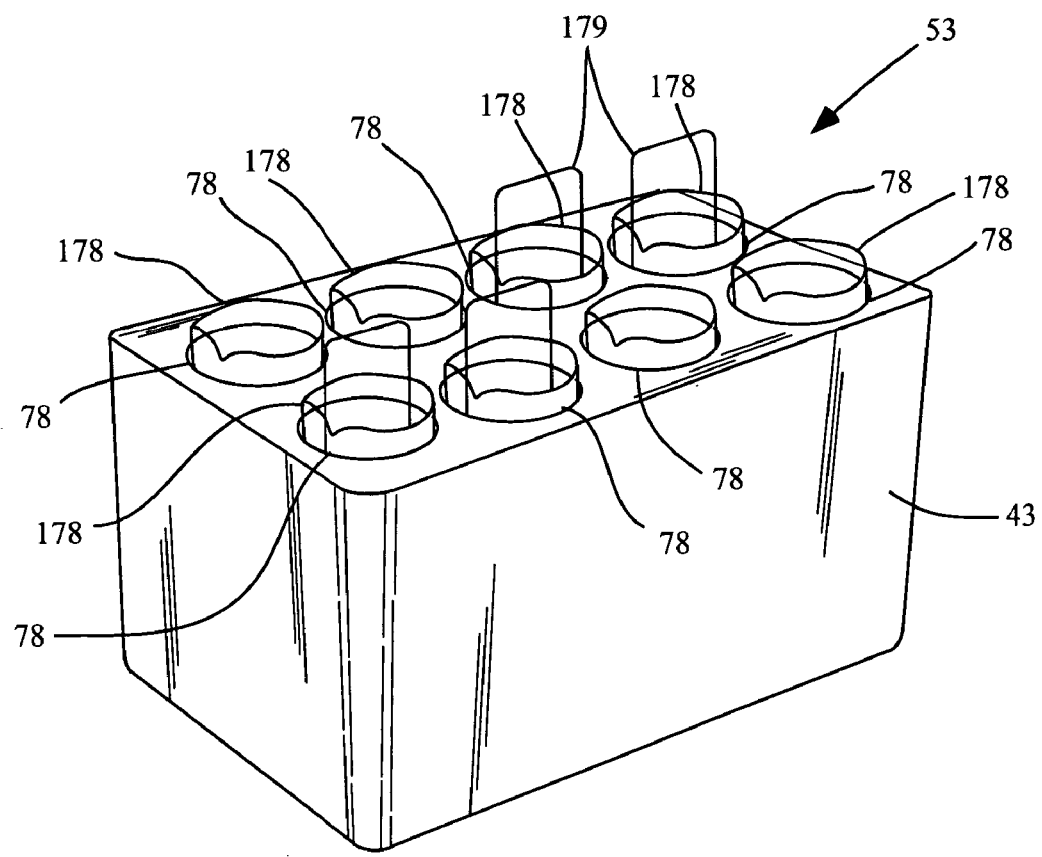
FIG. 3 shows another exemplary embodiment of a subject ultrasonic device having a plurality of fluid holding vessels.
Figure 4:
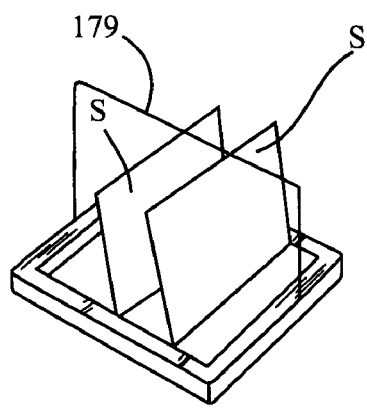
FIG. 4 shows an exemplary embodiment of a substrate holding element, herein shown holding two substrates.

FIG. 3 shows an exemplary embodiment of a subject device 53 that includes ultrasonic apparatus 43. Apparatus 43 is analogous to apparatus 40 of FIG. 1 and apparatus 41 of FIG. 2 except that apparatus 43 includes more than two holding vessels. Apparatus 43 includes a container rack having eight individual holding vessels 78. In this particular embodiment, each holding vessel is dimensioned to accommodate a beaker 178 or other such container therein such that the beaker holds the fluid to be ultrasonically agitated. One or more substrates may be placed directly in a respective beaker, or may be first positioned in a substrate holding element such as substrate holding element 179 shown in FIG. 4 holding two substrates S. The dimensions of beakers 178 may be analogous to the dimensions of holding vessel 75 of FIG. 1 or may be smaller.

Figure 5:
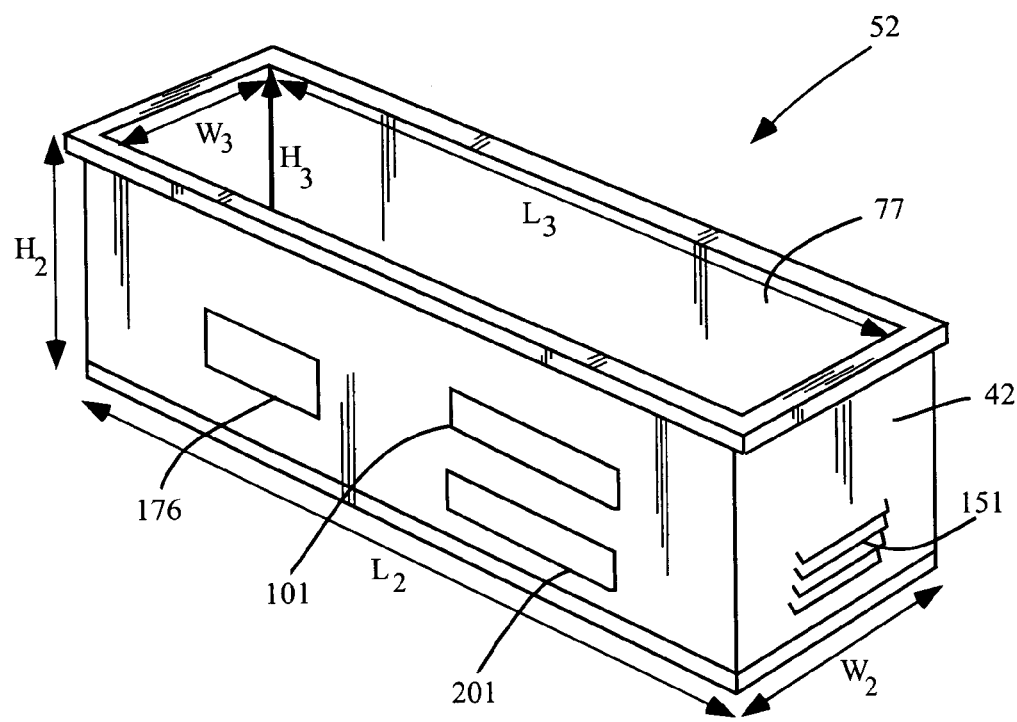
FIG. 5 shows yet another exemplary embodiment of a subject ultrasonic device that may be employed for large scale applications.

FIG. 5 shows an exemplary embodiment of a subject device 52 that includes ultrasonic apparatus 42 that may be used in large-scale operations. Apparatus 42 includes power generator 201 and vibratory element 101, as well as heating element 176, and heat exhaust element 151. Apparatus 52 also includes fluid holding vessel 77 which is dimensioned to accommodate a volume of fluid in the ranges described above. As noted above, apparatus 42 is configured for relatively large scale operations in accordance with the subject invention. As shown in FIG. 5, the outer dimensions of the apparatus may be characterized by width ($W_2$), Height ($H_2$) and length ($L_2$) and the inner dimensions or rather the dimensions of holding vessel 77 may be characterized by width ($W_3$), Height ($H_3$) and length ($L_3$). As such, the width of the apparatus may range from about 10 inches to about 45 inches, e.g., from about 14 inches to about 40 inches, e.g., from about 15 inches to about 30 inches, the length of the apparatus may range from about 15 inches to about 65 inches, e.g., from about 24 inches to about 50 inches, e.g., from about 25 inches to about 36 inches and the height of the apparatus may range from about 10 inches to about 50 inches, e.g., from about 14 inches to about 40 inches, e.g., 15 inches to about 35 inches. The dimensions of holding vessel 75 may be as follows: the width of the apparatus may range from about 10 inches to about 40 inches, e.g., from about 12 inches to about 38 inches, e.g., from about 14 inches to about 28 inches, the length of the apparatus may range from about 15 inches to about 60 inches, e.g., from about 22 inches to about 45 inches, e.g., from about 24 inches to about 35 inches and the height of the apparatus may range from about 10 inches to about 45 inches, e.g., from about 12 inches to about 35 inches, e.g., from about 14 inches to about 30 inches such that holding vessel 77 may have a volume that ranges from about 25 liters to about 1200 liters, e.g., from about 45 liters to about 650 liters, e.g., from about 70 liters to about 300 liters. Apparatuses with shapes other than square or rectangular, e.g., circular, etc., will have analogous dimensions. Similar to the small scale apparatuses described above, an apparatus configured for large scale operations may include more than one fluid holding vessel (not shown), where the holding vessels may include the same or different fluids such that one or more may include an ultrasonic fluid such as a particulate-containing fluids described above and one or more other holding vessels may include one or more rinse or wash mediums.

The ultrasonic generator employed in the subject invention is coupled to the apparatus and is capable of providing the necessary electric power and frequency for operating the one or more vibratory elements, e.g., transducers, of the apparatus to produce the desired ultrasonic power and ultrasonic frequency for modifying a substrate surface. Typically, the generator is capable of producing a power output level that ranges from about 300 watts to about 6000 watts, usually from about 600 watts to about 4000 watts and more usually from about 100 watts to about 3000 watts.

As described above, the subject apparatuses also include at least one vibratory element for converting electrical energy to vibratory energy which sonically agitates the fluid held in the apparatuses. This vibratory element may be any suitable element capable of providing the ultrasonic power and frequency required to carry out the subject methods, e.g., speaker coil, transducers, and the like. For example, transducers such as magnetostrictive and piezoelectric transducers may be employed in the subject invention to provide the required vibratory effect.

The vibratory element(s) of the subject invention are typically capable of producing ultrasonic frequencies in the ranges described above, e.g., about 20 Hz to about 20 kHz for sonic agitation and greater than about 20 kHz for ultrasonic agitation, e.g., capable of producing ultrasonic frequencies that range from about 20 kHz to about 200 kHz or more. In those embodiments having more than one vibratory element, some or all of the vibratory elements may produce the same ultrasonic frequencies or some or all may produce different frequencies, e.g., different ultrasonic frequencies. Usually, the vibratory elements of the subject invention are designed to be immersible in the fluids held in the apparatuses; however this need not be the case in certain embodiments. Accordingly, these vibratory elements may be positioned one or more walls of a fluid holding vessel. Electric power to the vibratory element(s) may be selectively controlled (manually or automatically). For example, where more than one vibratory element is employed, the electric power may be sequentially or intermittently supplied to the vibratory elements.

The subject apparatuses may be optionally equipped with a heating element in order to maintain the ultrasonic fluid at a temperature which is effective for carrying out the subject methods. Accordingly, the heating element is one that is capable of maintaining the ultrasonic fluid contained within the apparatus at temperatures that ranges from about 20° C. to about 100° C., usually from about 25° C. to about 70° C. and more usually from about 30° C. to about 60° C.

In certain embodiments, the subject apparatuses include a filtering system for the recirculation of a fluid employed in an apparatus. In this manner, contaminants in the fluid may be removed, e.g., contaminants removed from the surface of a substrate, thereby prolonging the effectiveness of the fluid and preventing any contaminants in the fluid from reducing the formation of ultrasonic cavitation. As the fluidic mediums of the subject invention include particulates, the filter system is configured to be compatible with the subject particulate-containing fluids, e.g., so that the filters do not clog with particulate and do not become worn-out. As such, the pores of the filtering system are sufficiently sized and are of a suitable material to be used with the subject ultrasonic fluids without damage thereto. The subject apparatuses may include one or more pumps which may be used to draw fluid through the filter system. The filter system typically includes a flow control valve.

The subject apparatuses also typically include a fluid inlet/outlet line for transferring fluids into and out of the apparatuses, e.g., to/from a reservoir or to a disposal system, where such inlet and outlet of fluids may be facilitated by the use of one or more pumps. These lines typically include a flow control valve. The fluid transport line is configured to be compatible with the subject particulate-containing fluids, e.g., so the lines do not clog with particulate and do not become worn-out. For example, the lines are robust enough (e.g., material, wall thickness, etc.,) for the continuous transport of the particulates therethrough. In certain embodiments the inlet line and outlet line are separate lines.

Any or all of the above-described components may be controlled manually or automatically. Accordingly, the subject apparatuses include suitable switches and timers as are known in the art for carrying out the respective functions of the various components. Such switches and timers are well known to those of skill in the art. For example, the switches could be standard electromagnetic relays or well known solid state switching devices. The timer(s) could be a simple motor driven mechanical clock mechanism that controls the "ON" and "OFF" timing sequence for the switches.

As described above, the subject apparatuses include at least one fluid holding vessel for retaining a volume of particulate-containing fluid to be ultrasonically (or sonically) agitated. As noted above, a feature of the subject invention is that the subject apparatuses are capable of carrying out the subject methods without damage to the apparatuses. Accordingly, the fluid holding vessel(s) in which a given particulate-containing fluid is retained is configured to be robust enough (material, dimensions, etc.) to withstand the bombardment of the particulates thereto during ultrasonic (or sonic) agitation without damage to the holding vessel(s).

Accordingly, the fluid holding vessels of the subject invention may be substantially smooth or planar or may include one or more recessed structures, elevated structures, channels, crevices, or other surface modifications, where such may serve to focus sonic energy from the one or more transducers to a particular area of the vessel and/or distribute impact from bombarding particulates. In certain embodiments a fluid holding vessel may include ledges, rails, ridges or the like upon which a substrate is positioned for surface modification.

The holding vessels of the subject invention also have sufficient wall thickness to withstand the particulate bombardment. While the dimensions may vary depending on the particular fluids, applications, etc., in many embodiments the wall thickness of a vessel is at least about 0.5 mm to about 0.75 mm, e.g., the wall thickness may range from about 0.5 mm to about 1 mm, e.g., from about 0.75 mm to about 1.5 mm.

The vessel(s) may be fabricated from a variety of materials, where the material(s) are chosen at least for compatibility with the fluids contained therein, compatibility with the substrates to be modified and resistance to damage or abrasion by the particles of the fluid. In certain embodiments, the holding vessels are coated with a material to minimize any wear to the vessels. Representative materials that may be employed in the subject fluid holding vessels include, but are not limited to, metals such as stainless steel, hastelloy, monel, coated ferrous metals, etc.

Systems

The subject invention also includes systems for modifying a substrate surface using ultrasonic agitation of a fluid. As such, the systems of the subject invention include at least a volume of a particulate-containing fluid, as described above and a subject device (a device capable of providing ultrasonic or sonic energy). As describe above, during use a volume of a particulate-containing fluid is placed in a fluid holding vessel of the device and ultrasonically or sonically agitated to modify a surface of a substrate contacted thereto. The particulate-containing fluid may be any suitable particulate-containing fluid as described above, e.g., may have an isoelectric point above the isoelectric point of the substrate and/or may include polymeric particulates such as synthetic polymeric particulates (e.g., elastic particulates) and/or may have a non-acidic pH (e.g., basic pH) and/or the particulates and the fluid medium may have substantially the same specific gravity.

Utility

The subject invention finds use in a variety of applications wherein the surface of a substrate is need of modification. Such substrate surface modifications may include, but are not limited to, cleaning, abrading, roughening, polishing, and the like. In certain embodiments, such modification is employed to remove chemistries and films or other particulates, substances and adherent residues and the like from a substrate surface such as residual laser debris (e.g., from laser-scribed glass), chemical mechanical polishing (CMP) and photoresist/post-etch residue removal, oils, greases, waxes, dust, oxides, fingerprints, tarnish, rust, dried blood, as well as many other organic and inorganic residues, substances and contaminants. In further describing the subject invention, the term "contaminant" will be used to generally describe a substance present on a substrate surface, regardless or its origin and make-up, in need of removal (i.e., an unwanted substance), where such term is not intended to be limiting in any manner.

The subject invention may be employed with a substrate that does not have a contaminant on a surface thereof. That is, a substrate surface employed in the subject methods may or may not actually have a contaminant thereon such that the substrate surface may be one that is suspected of having one or more contaminants on a surface thereof. These contaminants may be ones that are unintentionally deposited on a substrate surface or may be a byproduct of a prior modification procedure, e.g., laser debris, CMP and photoresist/post-etch residue removal and the like, or may be ones that are intentionally deposited on a substrate surface, e.g., may be useful for a certain modification procedure such as chemical modification and the like, but which are ultimately in need of removal, e.g., prior to a subsequent modification procedure and/or use of the final product.

The subject invention may be used to modify a variety of substrates or objects. Advantageously, the subject methods may be used with a wide variety of substrates without adversely affecting or deteriorating the substrate surfaces. The substrate may be fabricated from a single material, or be a composite of two or more different materials. For example, the substrates may be fabricated from a "composite," i.e., a composition made up of different or unlike materials. The composite may be a block composite, e.g., an A-B-A block composite, an A-B-C block composite, or the like. Alternatively, the composite may be a heterogeneous combination of materials, i.e., in which the materials are distinct from separate phases, or a homogeneous combination of different or unlike materials. As used herein, the term "composite" is used to include a "laminate" composite. A "laminate" refers to a composite material formed from several different bonded layers of identical or different materials. Representative materials from which a substrate may be fabricated include, but are not limited to: plastics, such as polyacrylamide, polyacrylate, polymethacrylate, polyesters, polyolefins, polyethylene, polytetrafluoro-ethylene, polypropylene, poly (4-methylbutene), polystyrene, poly(ethylene terephthalate); fused silica (e.g., glass); bioglass; silicon chips, ceramics; metals; and the like, where in certain embodiments optically transparent substrate are employed. In certain embodiments, the substrate is made from glass and in certain embodiments the substrate is laser-scribed glass.

The subject invention is not limited to any particular shape of substrate. Accordingly, the shapes of substrates may range from simple to complex. In many embodiments, the substrates will assume a square, rectangular, oblong, elliptical, oval or circular, e.g., spherical, shape. Substrates may have other geometric shapes, or irregular or complex shapes. In certain embodiments, the substrates are planar and in certain other embodiments the substrates have more complex configurations and shapes, e.g., may be substantially non-planar, including non-planar, and may include one or more of recessed structures, elevated structures, channels, crevices, openings or orifices, surface modifications, etc. The substrates may be rigid or flexible. By "rigid" it is meant that the substrate cannot be substantially bent or folded without breaking. By "flexible" it is meant the substrate, if flexible, may be substantially bent or folded without breaking, tearing, ripping, etc.

The subject invention is not limited to any particular size of substrate. As such, the size of a particular substrate may be as small as about 10 mm to about 20 mm or even smaller in certain embodiments, or as large as about 350 mm to about 500 mm or larger in certain embodiments. For example, where the substrate is a semiconductor substrate, the size of the substrate may range from about 76 mm to about 300, e.g., from about 150 mm to about 300 mm, e.g., from about 200 mm to about 300 mm. Where the substrate is a biopolymeric array substrate, the size of the substrate may range from about 10 mm to about 350 mm, e.g., from about 76 mm to about 350 mm, e.g., from about 76 mm to about 170 mm. Accordingly, the surface area of a substrate modified in accordance with the subject invention may range from about 0.100 $cm^2$ to about 123 $cm^2$ or more, e.g., from about 5.7 $cm^2$ to about 123 $cm^2$ or more, e.g., from about 5.7 $cm^2$ to about 29 $cm^2$ or more. The above dimensions are exemplary only and may vary depending on the particular application at hand.

The substrates may be assemblies or subassemblies of a final product or may be a final product. In other words, the substrates may be any substrate at any stage of manufacture from prior to the start of manufacture to the use of the final product. Exemplary substrates that may be modified in accordance with the subject invention include, but are not limited to, biopolymeric array substrates, semiconductor substrates (silicon wafers), LCD glass plates, medical and/or dental substrates and devices, laboratory equipment, e.g., laboratory glassware such as beakers, test tubes, etc., automobile assemblies and subassemblies, etc.

In certain embodiments, the subject invention is employed to modify a biopolymeric array substrate surface. Such biopolymeric arrays include a plurality of polymeric molecules or "probes" positioned on the substrate surface, as will be described in greater detail below. In many embodiments prior to positioning the probes on the substrate surface, the substrate surface may require modification. Accordingly, as described below, the subject invention may be employed to modify a substrate surface to provide a modified substrate surface. The modified substrate surface may then be used as a substrate in a biopolymeric array such that probes are positioned on the modified substrate surface to provide a biopolymeric array. The biopolymeric array may then be used in a variety of array assays, as will be described in greater detail below.

A variety of substrate surface modifications may be performed on any given biopolymeric array substrate surface, such as any of the substrate surface modifications described above (e.g., the substrate surface may be cleaned, abraded, roughened, polished, etc.). For example, during manufacture of array substrates for biopolymeric arrays (as well as certain other substrates such as silicon wafers for integrated circuits), laser identification marks may be scribed on each substrate, e.g., at the beginning of the production cycle, to maintain a reliable system of substrate tracking in order to effectively monitor the production line. These laser-scribed marks contain information for later substrate identification such as lot number and job number which may be used to relate in-the-field product failures to processing history. Such laser marks may also reflect not only a substrate's lot number, but may also indicate a particular reference location or address on the substrate such as an array location on an array substrate, i.e., may be used as fiducial marks. However, regardless of the reason for laser marking a substrate (e.g., the substrate could be produced by laser-scribing a substrate "precursor" and then singulating the laser-scribed glass at the scribe marks to provide a plurality of substrates), the process of substrate laser marking results in debris and chemical residue on the substrate surface which must be removed. Furthermore, other contaminants may need to be removed from the substrate surface prior to positioning probes on the substrate surface. As such, the subject invention is particularly useful in removing contaminants from substrates (or otherwise cleaning the substrates) for use in arrays such as removing laser debris or other contaminants from a substrate surface.

Thus, in accordance with the subject invention, one or more surfaces of an array substrate are modified by contacting the substrate surface with a sonically agitated amount of a particulate-containing fluid as described above. A variety of solid supports or substrates may be used such that the array substrate may be selected from a wide variety of materials including, but not limited to, natural polymeric materials, as well as synthetic or modified naturally occurring polymers, such as poly (vinyl chloride), polyamides, polyacrylamide, polyacrylate, polymethacrylate, polyesters, polyolefins, polyethylene, polytetrafluoro-ethylene, polypropylene, poly (4-methylbutene), polystyrene, poly (ethylene terephthalate), nylon, poly(vinyl butyrate), cross linked dextran, agarose, etc.; either used by themselves or in conjunction with other materials; fused silica (e.g., glass), bioglass, silicon chips, ceramics, metals, and the like. For example, substrates may include polystyrene, to which short oligophosphodiesters, e.g., oligonucleotides ranging from about 5 to about 50 nucleotides in length, may readily be covalently attached (Letsinger et al. (1975) Nucl. Acids Res. 2:773-786), as well as polyacrylamide (Gait et al. (1982) Nucl. Acids Res. 10:6243-6254), silica (Caruthers et al. (1980) Tetrahedron Letters 21:719-722), and controlled-pore glass (Sproat et al. (1983) Tetrahedron Letters 24:5771-5774). Additionally, the substrate can be hydrophilic or capable of being rendered hydrophilic.

Suitable array substrates may exist, for example, as sheets, tubing, spheres, containers, pads, slices, films, plates, slides, strips, disks, etc. The substrate is usually flat, but may take on alternative surface configurations. The substrate can be a flat glass substrate, such as a conventional microscope glass slide, a cover slip and the like. Common substrates used for the arrays of probes are surface-derivatized glass or silica, or polymer membrane surfaces, as described in Maskos, U. et al., Nucleic Acids Res, 1992, 20:1679-84 and Southern, E. M. et al., Nucleic acids Res, 1994, 22:1368-73.

Each array may cover an area of less than about 100 cm$^2$, or even less than about 50 cm$^2$, 10 cm$^2$ or 1 cm$^2$. In many embodiments, the substrate carrying the one or more arrays will be shaped generally as a rectangular solid (although other shapes are possible), where the length may range from more than about 4 mm and less than about 1 m, usually more than about 4 mm and less than about 600 mm, more usually less than about 400 mm; a width may range from more than about 4 mm and less than about 1 m, usually less than about 500 mm and more usually less than about 400 mm; and a thickness may range from more than about 0.01 mm and less than about 5.0 mm, usually more than about 0.1 mm and less than about 2 mm and more usually more than about 0.6 and less than about 1.5 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, the substrate may transmit at least about 20%, or about 50% (or even at least about 70%, 90%, or 95%), of the illuminating light incident on the substrate as may be measured across the entire integrated spectrum of such illuminating light or alternatively at 532 nm or 633 nm.

Following the modification of the array substrate surface in accordance with the subject invention as described above, the modified substrate may then be used in an array. Such arrays find use in a variety of applications, including gene expression analysis, drug screening, nucleic acid sequencing, mutation analysis, and the like. These arrays include a plurality of ligands or molecules or probes (i.e., binding agents or members of a binding pair) deposited onto the surface of a substrate in the form of an "array" or pattern.

Arrays include at least two distinct polymers that differ by monomeric sequence attached to different and known locations on the substrate surface. Each distinct polymeric sequence of the array is typically present as a composition of multiple copies of the polymer on a substrate surface, e.g., as a spot or feature on the surface of the substrate. The number of distinct polymeric sequences, and hence spots or similar structures, present on the array may vary, where a typical array may contain more than about ten, more than about one hundred, more than about one thousand, more than about ten thousand or even more than about one hundred thousand features in an area of less than about 20 cm$^2$ or even less than about 10 cm$^2$. For example, features may have widths (that is, diameter, for a round spot) in the range from about 10 µm to about 1.0 cm. In other embodiments, each feature may have a width in the range from about 1.0 µm to about 1.0 mm, usually from about 5.0 µm to about 500 µm and more usually from about 10 µm to about 200 µm. Non-round features may have area ranges equivalent to that of circular features with the foregoing width (diameter) ranges. At least some, or all, of the features are of different compositions (for example, when any repeats of each feature composition are excluded, the remaining features may account for at least about 5%, 10% or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents, but may not be present when, for example, photolithographic array fabrication process are used. It will be appreciated though, that the interfeature areas, when present, could be of various sizes and configurations. The spots or features of distinct polymers present on the array surface are generally present as a pattern, where the pattern may be in the form of organized rows and columns of spots, e.g. a grid of spots, across the substrate surface, a series of curvilinear rows across the substrate surface, e.g. a series of concentric circles or semi-circles of spots, and the like.

In the broadest sense, the arrays are arrays of polymeric or biopolymeric ligands or molecules, i.e., binding agents, where the polymeric binding agents may be any of: peptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like.

Accordingly, the modified substrate surfaces may be used as substrates for arrays such that arrays are produced using the modified substrate surfaces. The arrays may be produced using any convenient protocol. Various methods for forming arrays from pre-formed probes, or methods for generating the array using synthesis techniques to produce the probes in situ, including known light directed synthesis processes, are generally known in the art (see, for example, U.S. Pat. Nos. 6,180,351; 6,242,266; 6,306,599 and 6,420,180, the disclosures of which are incorporated herein by reference). For example, probes can either be synthesized directly on the solid support or substrate to be used in the array assay or attached to the substrate after they are made. Arrays may be fabricated using drop deposition from pulse jets of either polynucleotide precursor units (such as monomers) in the case of in situ fabrication, or the previously obtained polynucleotide. Other drop deposition methods may be used for fabrication. Also, instead of drop deposition methods, photolithographic array fabrication methods may be used. As mentioned above, interfeature areas need not be present, particularly when the arrays are made by photolithographic methods as described in those patents. Accordingly, as described above, the probes may be synthesized directly on a substrate, or pre-made probes may be attached to the substrate, after the substrate has been modified according to the subject invention.

Immobilization of the probe to a suitable substrate may be performed using conventional techniques. See, e.g., Letsinger et al. (1975) Nucl. Acids Res. 2:773-786; Pease, A. C. et al., Proc. Nat. Acad. Sci. USA, 1994, 91:5022-5026, and Oligonucleotide Synthesis, a Practical Approach," Gait, M. J. (ed.), Oxford, England: IRL Press (1984). The surface of a substrate may be treated with an organosilane coupling agent to functionalize the surface. See, e.g., Arkins, ASilane Coupling Agent Chemistry," Petrarch Systems Register and Review, Eds. Anderson et al. (1987) and U.S. Pat. No. 6,258,454.

Any given substrate may carry one, two, four or more arrays disposed on a surface of the substrate. Depending upon the use, any or all of the arrays may be the same or different from one another and each may contain multiple spots or features. For example, a plurality of arrays may be stably associated with one substrate, where the arrays are spatially separated from some or all of the other arrays associated with the substrate.

A feature of the arrays produced by the subject methods is that they are ultrasonically or sonically-modified according to the subject invention and more specifically the substrate is modified according to the subject invention. For example, in those embodiments where modification of the array substrate included the removal of laser scribing residue or debris, a feature of these arrays is that they are modified in accordance with the subject invention such that they are free of laser debris or residue produced from the laser scribing. For example, the array substrate may be laser scribed and then subject to modification according to the subject methods to remove the laser debris and thereafter probes may be provided on the modified substrate surface. Likewise, in those embodiments where the modification of the array substrate includes polishing the array substrate or the like, a feature of these arrays is that they are modified in accordance with the subject invention such that they are sonically or ultrasonically polished array substrates. For example, the array substrate may be modified according to the subject methods to polish a surface of the substrate and thereafter probes may be provided on the modified substrate surface.

The arrays produced according to the subject invention find use in a variety of different applications, where such applications are generally analyte detection applications in which the presence of a particular analyte in a given sample is detected at least qualitatively, if not quantitatively. Specific analyte detection applications of interest include, but are not limited to, hybridization assays. While the subject invention finds use in array hybridization assays, the subject invention also finds use in any suitable binding assay in which members of a specific binding pair interact. That is, any of a number of different binding assays may be performed with the subject invention, where typically a first member of a binding pair is stably associated with the surface of a substrate and a second member of a binding pair is free in a sample, where the binding members may be: ligands and receptors, antibodies and antigens, complementary nucleic acids, and the like. For ease of description only, the subject invention will be described primarily in reference to hybridization assays, where such examples are not intended to limit the scope of the invention. It will be appreciated by those of skill in the art that the subject devices and methods may be employed for use with other binding assays as well, such as immunoassays, proteomic assays, etc In these hybridization assays, a sample of target nucleic acids is first prepared, where preparation may include labeling of the target nucleic acids with a label, e.g. a member of signal producing system. Following sample preparation, the sample is contacted with the array under hybridization conditions, whereby complexes are formed between target nucleic acids that are complementary to probe sequences attached to the array surface. The presence of hybridized complexes is then detected. Specific hybridization assays of interest which may be practiced using the subject arrays include: gene discovery assays, differential gene expression analysis assays; nucleic acid sequencing assays, and the like. Patents generally describing methods of using arrays in various applications include U.S. Pat. Nos. 5,288,644; 5,432,049; 5,470,710; 5,492,806; 5,503,980; 5,525,464; 5,580,732; 5,661,028; and 5,800,992; the disclosures of which are herein incorporated by reference.

Where the arrays are arrays of polypeptide binding agents, e.g., protein arrays, specific applications of interest include analyte detection/proteomics applications, including those described in U.S. Pat. Nos. 4,591,570; 5,171,695; 5,436, 170; 5,486,452; 5,532,128; and 6,197,599; the disclosures of which are herein incorporated by reference; as well as published PCT application Nos. WO 99/39210; WO 00/04832; WO 00/04389; WO 00/04390; WO 00/54046; WO 00/63701; WO 01/14425; and WO 01/40803, the disclosures of the United States priority documents of which are herein incorporated by reference.

Reading of the array may be accomplished by illuminating the array and reading the location and intensity of resulting fluorescence at each feature of the array to detect any binding complexes on the surface of the array. For example, a scanner may be used for this purpose such as the AGILENT MICROARRAY SCANNER available from Agilent Technologies, Palo Alto, Calif., or any other scanner that is suitable for reading or scanning an array such as described in U.S. Pat. Nos. 6,406,849; 6,486,457; 6,518,556 and 6,583,424, the disclosures of which are herein incorporated by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,251,685 and elsewhere). Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing), as now described in greater detail.

In certain embodiments, data from at least one of the detecting and deriving steps, as described above, may be transmitted to a remote location. By "remote location" it is meant a location other than the location at which the array is present and hybridization occur. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, Internet, etc.

Kits

Also provided are kits for use in practicing the subject methods. The subject kits include at least some of the components for preparing a particulate containing fluid described above. As such, the kits may include one or more containers such as vials or bottles, with each container containing a separate component or a number of compatible components of a particulate containing fluid. For example, a kit may include one or more of: a fluidic medium (e.g., purified water, solvent, and the like) or components thereof; particulates (for example provided in dry or slurry form); buffer, surfactant, saponifier, wetting agent, emulsifier, dispersant, rinse medium, etc., as described above. For example, a kit may include a fluidic medium having a particular pH (e.g., commensurate with the pH of a particular substrate to be modified and/or particular contaminant) and/or may include synthetic polymeric particulates (e.g., elastic particulates) and/or may have a particular specific gravity (e.g., to be commensurate with the specific gravity of the particulates (e.g., substantially the same), as described above.

Figure 6:
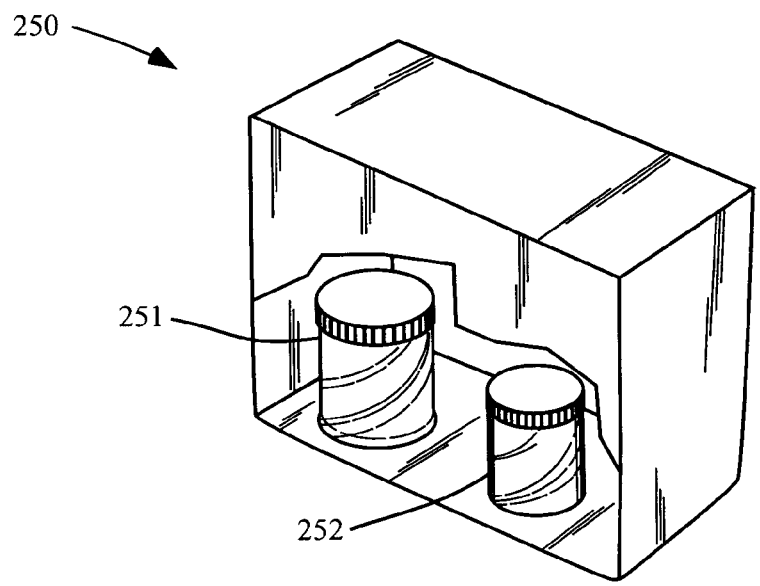
FIG. 6 shows an exemplary embodiment of a subject kit.

In many embodiments of the subject kits, the reagents for preparing a particulate containing fluid are packaged in a kit containment element to make a single, easily handled unit, where the kit containment element, e.g., box or analogous structure, may or may not be an airtight container, e.g., to further preserve the components until use. FIG. 6 shows such a cut away view of a kit containment element 250 that includes at least component 251, e.g., fluidic medium, and component 252, e.g., a slurry of particulates.

The subject kits also generally include instructions for how to prepare a particulate containing fluid and/or how to use the particulate-containing fluid to modify a substrate surface. The instructions are generally recorded on a suitable recording medium or substrate. For example, the instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

EXPERIMENTAL

The following examples are put forth so as to provide those of ordinary skill in the art with a complete disclosure and description of how to make and use the present invention, and are not intended to limit the scope of what the inventors regard as their invention. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Substrate Modification Example

A glass substrate surface was subjected to a laser ablation protocol and was then modified in accordance with the subject invention to remove the laser ablation debris from the substrate surface. The specific protocol employed to remove the laser debris from the substrate surface is described in greater detail below.

Materials

Particulate Slurry: 50% by volume 40 nm $SiO_2$ particles in deionized water

Fluidic medium: deionized water and NaOH as a saponifier and various high pH detergents as surfactants.

Substrate modifying particulate-containing fluid: 7.5% silica particulates to 92.5% deionized water (by volume) with buffer to maintain the pH at 10.2.

Substrates: glass substrate, n=25

Protocol

Each of the substrates was subjected to laser scribing. After the laser etching, the amount of debris on each of the substrates was determined by measuring a specific area on the substrate surface. Debris on the area was determined by using an automated inspection microscope (Optical Gauging Products [OGP] ATS-700 Smartscope, 330× magnification).

After laser scribing the substrates and determining the amount of laser debris present on the surface of each of the substrates, each substrate was contacted with a sufficient volume of the substrate modifying particulate-containing fluid described above. The temperature of the substrate modifying particulate-containing fluid was maintained at 35° C. and the fluid was ultrasonically agitated for 30 minutes (ultrasonic power=90 Watts, frequency=50 kHz).

After modifying the substrates by ultrasonically agitating the substrate modifying fluid, the substrates were removed from the fluids. The same areas of the substrate surfaces measured after the laser scribing were then measured again in a manner analogous to that described above to provide a post-modification debris measurement. This debris was then compared to the measurement taken after the laser scribing, but prior to the ultrasonic modification, to determine the amount of debris removed by the subject method.

Results

The results showed that all measurable laser debris was removed from each of the substrate surfaces by the subject method.

It is evident from the above results and discussion that the above-described invention provides useful methods and devices for modifying a substrate surface. Specifically, the subject invention provides methods and devices for modifying a substrate surface that are safe to the operator as well as safe to the environment, easy to use, cost effective, enable short cycle times, are compatible with the substrate surfaces being modified such that they do not produce scratches or other unwanted aberrations on the substrates, and which are effective at modifying a substrate surface. As such, the subject invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of removing laser debris from a laser-scribed substrate surface, said method comprising:
   (a) providing a fluid comprising insoluble particulates wherein the particulates are synthetic polymers;
   (b) contacting said substrate surface with said fluid; and
   (c) ultrasonically or sonically agitating said fluid in contact with said substrate to remove laser debris from said substrate surface.

2. The method of claim 1, wherein said partictilate-comprising fluid is non-acidic.

3. The method of claim 2, wherein said fluid has a basic pH.

4. The method of claim 1, wherein said particulate-comprising fluid comprises particulate ranging in size from about 15 nanometers to about 500 microns.

5. The method of claim 1, wherein said particulate-comprising fluid comprises particulates in a concentration ranging from about 1% to about 99% by volume.

6. The method of claim 5, wherein said particulate-comprising fluid comprises particulates in a concentration ranging from about 1% to about 50% by volume.

7. The method of claim 1, wherein said particulate-comprising fluid is agitated at a frequency ranging from about 20 kHz to about 200 kHz.

8. The method of claim 1, wherein said particulates and said fluid have substantially the same spedific gravity.

9. The method of claim 1, wherein said fluid is chosen from water, toluene, ethanol, acetone, acetyl nitrile, dichloromethane, water with calcium chloride and water with lithium chloride.

10. The method of claim 1, wherein said particulates are chosen from silica, metals, metal oxides, synthetic polymers, natural polymers, ceramics and fossilized silica deposits.

11. The method of claim 10, wherein said particulates are elastic.

12. The method of claim 1, wherein said substrate is laser-scribed glass.

13. The method of claim 12, further comprising producing an array of probes on said modified laser-scribed glass substrate.

14. A method of modifying a laser-scribed glass substrate surface, said method comprising:
(a) contacting said laser-scribed glass substrate surface with a particulate-comprising fluid, wherein said particulates are synthetic polymers; and
(b) ultrasonically or sonically agitating said particulate-comprising fluid to modify said laser-scribed glass substrate surface.

15. The method of claim 14, wherein said particulate-comprising fluid has a pH above the isoelectric point of said laser-scribed glass substrate.

16. The method of claim 14, wherein said particulates and said fluid have substantially the same specific gravity.

17. The method of claim 14, wherein said particulate-comprising fluid is non-acidic.

18. A method of modifying a substrate surface, said method comprising:
(a) providing a fluid comprising Insoluble synthetic polymers;
(b) contacting said substrate surface with said fluid; and
(c) ultrasonically or sonically agitating said fluid to modify said substrate surface.

19. The method of claim 18, wherein said synthetic polymer-comprising fluid has a pH above the isoelectric point of said substrate.

20. The method of claim 18, wherein said substrate is laser-scribed glass.

21. The method of claim 18, wherein said synthetic polymer and said fluid have substantially the same specific gravity.

22. The method of claim 18, wherein said synthetic polymer-comprising fluid is non-acidic.

23. A method of modifying a substrate surface, said method comprising:
(a) providing a basic fluid comprising insoluble particulates, wherein the particulates are synthetic polymers;
(b) contacting said substrate surface with said basic fluid; and
(c) ultrasonically or sonically agitating said basic fluid to modify said substrate surface.

24. The method of claim 23, wherein said basic particulate-comprising fluid has a pH above the isoelectric point of said substrate.

25. The method of claim 23, wherein said particulates and said basic fluid have substantially the same specific gravity.

26. The method of claim 23, wherein said substrate is laser-scribed glass.

27. A substrate modified according to claim 1.

28. A method for producing a biopolymeric array, said method comprising:
(a) modifying at least one surface of a substrate according to claim 1 to provide a modified substrate; and
(b) producing an array of probes on said modified substrate.

29. A biopolymeric array produced according to claim 28.

30. A method for producing a biopolymeric array on a laser-scribed glass substrate, said method comprising:
(a) modifying at least one surface of a laser-scribed glass substrate according to claim 1 to provide a modified laser-scribed glass substrate; and
(b) producing an array of probes on said modified laser-scribed glass substrate.

31. A method comprising exposure of a biopolymeric array of claim 30 to a sample and performing a binding assay with said biopolymeric array.

32. A method comprising, following exposure of a biopolymeric array of claim 31 to a sample, reading said biopolymeric array.

33. A method comprising forwarding data representing a result or a reading obtained by the method of claim 32.

34. The method according to claim 33, wherein said data is transmitted to a remote location.

35. A device for modifying a substrate surface comprising a fluid according to claim 1, said fluid contained therein, wherein said device is capable of ultrasonically or sonically agitating said fluid.

36. A system for modifying a substrate surface, said system comprising:
(a) a device capable of ultrasonically or sonically agitating a fluid contained therein; and
(b) a fluid according to claim 1 for use with said apparatus.

37. A kit comprising:
(a) fluidic medium;
(b) particulates for use with said fluidic medium, wherein the particulates are synthetic polymers; and
(c) instructions to combine said fluidic medium and said particulates to produce a particulate-comprising fluid for use in the method of claim 1.

* * * * *